United States Patent [19]
Curby et al.

[11] Patent Number: 4,755,057
[45] Date of Patent: * Jul. 5, 1988

[54] PATH LENGTH CONTROL METHOD FOR RING LASER GYROSCOPE

[75] Inventors: Robert D. Curby, Thousand Oaks; Rodney W. Benoist, Moor Park; Masao Yashimoto, Woodland Hills, all of Calif.

[73] Assignee: Litton Systems, Inc., Beverly Hills, Calif.

[*] Notice: The portion of the term of this patent subsequent to Apr. 26, 2005 has been disclaimed.

[21] Appl. No.: 904,170

[22] Filed: Sep. 5, 1986

Related U.S. Application Data

[63] Continuation of Ser. No. 656,944, Oct. 2, 1984.

[51] Int. Cl.$^4$ .............................................. G01C 19/64
[52] U.S. Cl. ................................................... 356/350
[58] Field of Search ........................................ 356/350

[56] References Cited

U.S. PATENT DOCUMENTS

| | | | |
|---|---|---|---|
| 3,395,270 | 7/1968 | Speller | 235/150.25 |
| 3,411,849 | 11/1968 | Aronowitz | 356/28 |
| 3,503,005 | 3/1970 | Mocker | 331/94.5 |
| 3,512,890 | 5/1970 | McLaughlin | 356/106 |
| 3,627,422 | 12/1971 | Chodorow | 356/350 |
| 3,697,887 | 10/1972 | Lee et al. | 331/94.5 |
| 3,743,969 | 7/1973 | Hutchings | 332/7.51 |
| 3,807,866 | 4/1974 | Zingery | 356/350 |
| 3,854,819 | 12/1974 | Andringa | 356/350 |
| 4,013,365 | 3/1977 | Vali et al. | 356/106 |
| 4,039,260 | 8/1977 | Redman | 356/350 |
| 4,248,534 | 2/1981 | Elbert | 356/350 |
| 4,267,478 | 5/1981 | Ljung et al. | 356/350 |
| 4,274,832 | 1/1981 | Sanders et al. | 331/94.5 |
| 4,295,710 | 10/1981 | Heinz | 350/310 |
| 4,309,107 | 1/1982 | McNair et al. | 356/350 |
| 4,314,174 | 2/1982 | Wing et al. | 310/315 |
| 4,321,557 | 3/1982 | McNair | 372/33 |
| 4,349,183 | 9/1982 | Wirt et al. | 267/160 |
| 4,383,763 | 5/1983 | Hutchings et al. | 356/350 |
| 4,392,229 | 7/1983 | Hostetler | 372/94 |
| 4,422,762 | 12/1983 | Hutchings et al. | 356/350 |
| 4,436,423 | 3/1984 | Kumar et al. | 356/350 |
| 4,526,469 | 7/1985 | Egli et al. | 356/350 |
| 4,529,311 | 7/1985 | Morgan et al. | 356/350 |
| 4,530,097 | 7/1985 | Stokes et al. | 372/6 |

FOREIGN PATENT DOCUMENTS

| | | | |
|---|---|---|---|
| 2749157 | 11/1978 | Fed. Rep. of Germany | 356/350 |
| 2271542 | 12/1973 | France | 356/350 |

OTHER PUBLICATIONS

Coccoli, "An Overview of Laser Gyros", 12th Joint Services Data Exchange for Inertial Systems, Norfolk, VA, 1978.

Menegozzi et al., "Theory of a Ring Laser", 1973, Physical Review, vol. 8, No. 4, pp. 2103-2125.

Kilpatrick, "The Laser Gyro", Oct. 1967, IEEE Spectrum, pp. 44-55.

*Primary Examiner*—Davis L. Willis
*Assistant Examiner*—S. A. Turner
*Attorney, Agent, or Firm*—John H. Lynn

[57] ABSTRACT

The present invention provides for initializing the particular intensity peak selected to operate about, based upon the initial temperature of the gyroscope in order to maintain a selected integer number of wavelengths as the initial cavity path length from start up to start up. In addition, the present invention provides an optimum available movement of the mirrors due to changing the voltage over the available voltage swing for the anticipated range and direction of temperature changes from the start up temperature, over which the gyroscope is expected to operate.

12 Claims, 6 Drawing Sheets

PATH LENGTH CONTROL METHOD FOR RING LASER GYROSCOPE

This is a continuation of co-pending application Ser. No. 656,944 filed on Oct. 2, 1984.

FIELD OF INVENTION

The present invention relates to ring laser gyroscopes and more specifically to pathlength control for ring laser gyroscopes which selects an initial operating mode based upon gyroscope startup temperature and the expected range of operating temperatures, and compensates for temperature changes during the operation of the gyroscope which have an effect on the gyroscope path length.

BACKGROUND AND SUMMARY OF THE INVENTION

It is well known in the art that ring lasers may be adapted to be used as angular rate sensors. Such ring lasers are known as ring laser gyroscopes. In such a ring laser gyroscope the difference between frequencies of counter-propagating radiant energy in the form of laser beams is a measure of the rate of angular rotation of the structure in which the propagating waves are traveling. Further background and discussion of the basics of ring laser gyro operation may be found, for example, in Killpatrick, "The Laser Gyroscope", IEEE Spectrum, October, 1967; Coccoli, "An Overview of Laser Gyroscopes", P-634 12th Joint Services Data Exchange for Inertial Systems, Norfolk, Va. October, 1978; and U.S. Pat. Nos. 4,383,763 to Hutchings et al. assigned to the assignee of the present application and 4,422,762 to Hutchings et al. assigned to the assignee of the present application, the disclosures of each of which are hereby incorporated by reference.

It is known in the art, as shown in the U.S. Pat. No. 4,422,762 to Hutchings noted above, to dither the mirrors of the ring laser gyro, or some of them, in order to avoid the phenomenon known as lock-in which occurs when the angular rotation rate of the ring laser gyro is close to zero, and is the result of the operating characteristics of a ring laser gyro, e.g., back-scattering of light from the mirrors defining the propagation cavity. In addition, as discussed in that patent, it is known in the art to translate one or more of the mirrors under the control of a piezoelectric transducer, upon which the mirror is mounted, inwardly and outwardly to adjust the propagation cavity length in order to maintain the cavity at a selected integer multiple of the wave length of the laser beam. That patent also discusses a manner of accomplishing this by sensing the AC envelope of the intensity of the counter-propagating beams summed together, which envelope has a peak at an optimum cavity path length, when the path length is an integer multiple of the wave length of the counter-propagating beams.

The piezoelectric transducers used to translate the mirrors to modify the path length have some finite sweep range determined by such things as the range of voltages applied to the piezoelectric transducer, the material of the piezoelectric transducer and the physical structure of the piezoelectric transducer and mirror assembly. Typically, the piezoelectric transducer is capable of translating the mirrors sufficiently to pass through a plurality of, for example, from four to six intensity maxima, i.e., to change the cavity path length through a range of about six integer multiples of the beam wave length.

It is also known that temperature variation due to, for example, changing the environment in which the laser gyroscope is operating, will cause thermal expansion or contraction of the laser gyroscope body and thus the cavity containing the path for the counter-propagating beams. This changes the cavity path length.

The present invention provides for initializing the particular intensity peak selected to operate about, based upon the initial temperature of the gyroscope in order to maintain a selected integer number of wavelengths as the initial cavity path length from start up to start up. In addition, the present invention provides an optimum available movement of the mirrors due to changing the voltage over the available voltage swing for the anticipated range and direction of temperature changes from the start up temperature, over which the gyroscope is expected to operate. This will be referred to herein as selecting the mode for the gyro. It is based upon which of the possible intensity maxima corresponds to a selected path length, and optimizes the expected movement of the path length control mirror or mirrors over the range of temperature changes which the gyroscope is expected to experience in operation, based upon the initial temperature. In this manner, the same path length, (an integer multiple of the laser wavelength), is selected for each start-up, regardless of start up temperature. Ring laser gyro scale factor variables vary with the cavity path length. Scale factors relate the output beat frequency of the counter-rotating beams to the angular variation of the gyro, i.e., gyro input. Therefore, the present invention initiates each operation at a mode which retains the same scale factor variables from start-up to start-up. In this manner, also, the necessity for a mode hop to another peak intensity during the operation of the gyro may be obviated. Such a mode hop would be necessitated, if the changes in the path length resulting from temperature changes are extensive enough to be beyond the capability of the piezoelectric transducers, on the mirror or mirrors used for path length control to translate the mirrors sufficiently to maintain the desired path length.

Recognizing the need for improved cavity path length control, it is a general object of the present invention to provide an improved method and apparatus for maintaining the correct cavity path length in ring laser gyro, including a method and apparatus for initially selecting an optimum operating range for expected temperature variations.

A feature of the present invention involves, initially, slewing the cavity length control mirror or mirrors through their entire operational range and sampling the beam intensity and storing the position of the intensity peaks. Thereafter, a particular peak is selected about which to maintain zero detuning, based upon the initial operating temperature of the gyoroscope.

A further feature of the present invention is to employ a plurality of, for example, three selected operating temperature ranges, for example, one below a temperature $T_1$, one between a temperature $T_1$ and a temperature $T_2$ and one above the temperature $T_2$. The initial temperature of the gyroscope in these empirically selected temperature bands at the time the system is turned on is employed as a means for optimally selecting a particular peak about which to carry out detuning. The selection results in the initial cavity path length being a selected integer multiple of the laser wavelength and detune being carried out to maintain that integer multiple in this operating mode. Also, the selection results in selecting an initial value of the voltage output to the piezoelectric mirror drive transducers which will allow for a greater change in the direction of high or low temperature response, if the initial temperature is, respectively, low or high, and about an equal range of change in either direction where the start-up temperature is initially in a mid-range. The piezoelectric transducer, therefore, will have sufficient operating range to maintain detune about the selected peak from, e.g., −54° C. to +80° C.

Another feature of the present invention is that for some laser gyroscopes, depending upon various parameters of the structure and operation of the ring laser, may be initially set at the proper mode based solely upon determing the start-up temperature. Where the number of mode peaks occurring over the entire sweep of the CLC mirrors is, e.g., four or less, and/or where the laser exhibits no significant secondary peaks, it may be possible to empirically determine a voltage to which to slew the CLC mirrors which will insure that by engaging the tracking function from such an initial position of the mirrors, the result is to attain the desired mode about which detune is controlled.

Of course, it will be understood that a ring laser gyroscope, according to the present invention, has the capability to slew the path length control mirrors to a position to employ another of the intensity maxima as a detuning point. This might occur, if the temperature change causes a path length variation beyond the capability of the path length control mirrors to correct in the initial mode selected. However, mode shifting results in the injection of inaccurate gyro output data while such slewing occurs. It will also result in having some scale factor error. The present invention is intended to reduce to a minimum the chances of the need for mode shifting occurring during actual operation of the gyroscope in some changing environment.

The above features of the present invention have been given in a general way in order that the more detailed description of the invention which follows may be better understood and the contribution to the art better appreciated. The full scope and content of the present invention will be appreciated by referring to the detailed description of the preferred embodiment in conjunction with the appended drawings wherein like reference numerals have been used to refer to like elements, and in which:

DETAILED DESCRIPTION OF A PREFERRED EMBODIMENT

Figure 1:
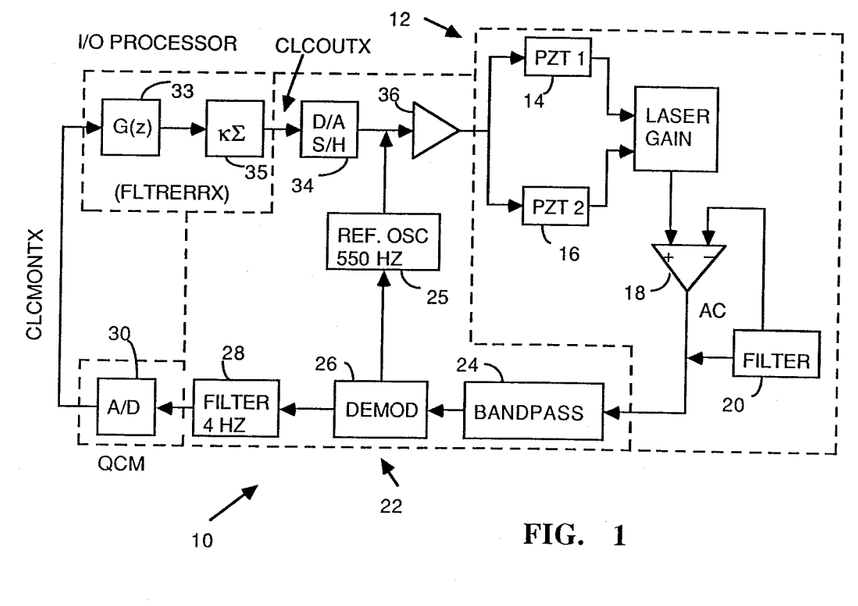
FIG. 1 shows a block diagram of a cavity length control circuit employing digital data processing.

Turning now to FIG. 1, a cavity length control circuit 10, according to the present invention provides a means by which the optical cavity path length for the ring laser gyro may be tuned to a selected intensity maximum. For example, for a 28 centimeter ring laser gyro, cavity detuning may be given in frequency units of MHz, where the equivalent detuning frequency for one longitudinal mode change is 1,071 MHz.

Figure 2:
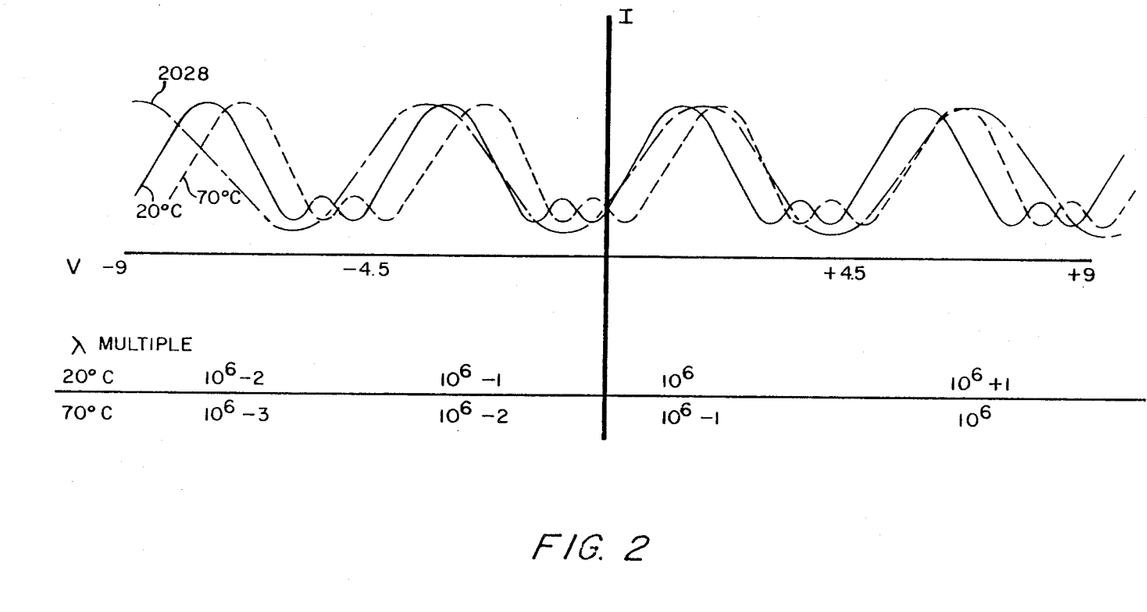
FIG. 2 shows a graphical representation of a plurality of optical intensity maxima at different startup temperatures, with and without intermediate secondary peaks.

As is shown in FIG. 2, the amplitude of the sum of the intensities of the counter-rotating beams passes through a number of maxima as the voltage applied to the piezoelectric transducer varies about a zero voltage point to increase the optical cavity length by increasing the voltage from some minus value to some plus value. The distance $\Delta L$ between the peaks for a 28 centimeter ring laser gyro cavity, mentioned above, is the equivalent of one longitudinal mode change. Intervening secondary peaks may occur between the maxima, as is also shown by the solid and dashed curves in FIG. 2. It will be understood by those in the art that the physical parameters of the ring laso gyro may result in more than four maxima peaks within the cavity path length mirror sweep and also may result in the absence of secondary peaks, (dot-dash curve in FIG. 2). The cavity length control circuit 10 according to the present invention maintains the cavity length such that the optical intensity stays at a selected maxima, i.e., corresponding to a selected integer multiple of the wavelength of the ring laser gyro beams. Thus, the mode center or intensity maximum represents a fixed optical frequency of the ring laser gyro determined by the parameters of the lasing medium. Variations in the cavity length about the mode center cause variations in the resonance frequency of the cavity and intensity variations due to the frequency dependency of the gain of the ring laser gyro.

The cavity length control circuit 10 provides an input to the ring laser gyro 12, which may be, for example, an LG8028B ring laser gyro, manufactured by the assignee of the present invention. A similar gyroscope, except with a 17 cm cavity, is discussed in Grant, Jr., "The Litton LC-2717 Laser Gyro", NAECON Proceedings, June, 1979, the disclosure of which is hereby incorporated by reference. This input signal provides a driving signal to a pair of piezoelectric transducers 14 and 16 which drive the mirrors associated with the piezoelectric transducers 14 and 16 to maintain a detune of zero, i.e., maintain the optical intensity, as sensed by the photo-detector behind a third of the ring laser gyro mirrors, at an optical maxima. The output of the photodetector measuring the optical intensity is an input to a detune feedback loop through an amplifier 18, having the intensity connected to its positive terminal and its output fed back to its negative terminal through feedback loop 20.

The amplifier 18 and feedback loop 20 together form essentially a high pass filter having about a one second time constant, i.e., about 1.5 Hz (1 radian/sec/$2\pi$). The output of the amplifier 18 is the A.C. component of the optical intensity input to the amplifier 18 due to the dithering of the mirrors at some frequency, e.g., 5050 Hz. The output of the feedback loop is the D.C. value of optical intensity. The output of the amplifier 18 also forms an input to the gyro electronics portion 22 of the cavity length control circuit 10. This input is fed through a bandpass filter 24, having a center frequency of a selected value, for example, 5,050 Hz (nominally 5k Hz). The output of the bandpass filter 24 is demodulated in a phase sensitive synchronized demodulator 26 which demodulates with a reference oscillation at the 5050 Hz reference from a reference oscillator 25. The output of the demodulator 26 is further filtered through a lowpass filter 28 having a cut-off frequency of approximately 4 Hz. The output of the lowpass filter 28 forms an output of the gyro electronics circuit 22 and an input to the digital data processor associated with the ring laser gyro through an analog-to-digital converter 30. The digital output of the analog-to-digital converter 30, which samples the analog signal output of the filter 28 at a rate of 21.5 Hz forms an input CLCMONIX to the I/O processor 32 which is representative of the feedback detune value. The feedback detune value CLCMONIX is essentially the slope of the A.C. optical intensity at any given cavity path length control position of the mirrors. Therefore, when CLCMONIX is equal to zero, either a peak or a valley exists. The feedback detune value CLCMONIX is filtered by a digital filter 33 characterized by a function G(z) in the I/O processor 32, as is known in the art for noise reduction, to produce a filtered error value FLTRERRX.

The FLTRERRX signal is then digitally integrated by an integrator 35 in the I/O processor 32. The function $k\Sigma$ is the programmed tracking function when the gyroscope is in the tracking mode. The value k is a software gain factor set, e.g., at $\frac{1}{8}$ or 1/32 for, respectively a capture mode where more radical changes in mirror position are needed to obtain a detune of O and at 1/32 for normal tracking to maintain a detune of O.

The output of the integration of the signal FLTRERRX is a digital signal CLCOUTX, the output control value for the transducers 14 and 16, which forms an input back into the gyro electronics circuit 22 through a digital-to-analog converter 34, which also includes a sample and hold circuit. The output of the digital-to-analog converter 34 is modulated with the 5050 Hz reference oscillation and amplified in an amplifier 36 to provide the control signal to the piezoelectric transducers 14 and 16 in the ring laser gyroscope 12.

A timing sequence at a time shortly after turn-on for a ring laser gyro, according to present invention, is given in Table 1.

TABLE 1

| TIMING SEQUENCE AT TURN-ON | |
|---|---|
| TIME (SEC) | DESCRIPTION |
| 0 | Start CLC Sweep |
| 0-5 | Map CLC and Log all Intensity Peaks. |
| 6 | Select a Peak as a Function of Startup Temperature |
| 7 | Set CLC to Selected Peak Engage CLC Track Mode |

NOTE: Dither control and CLC acquire times are approximate.

The timing sequence assumes, e.g., the presence of three ring laser gyros, having their axes of rotation orthogonal to each other, mounted on a common block. During the period of time in startup before some arbitrarily selected time 0 in Table 1, the gyro, under programmed control, is establishing certain operating parameters and startup functions, e.g., dither track control is engaged, the gyros are swept to provide data for the amplitude control loop of the dither control and open loop drive of all gyros is engaged. Along with the engaging of the dither track control, high voltage enable is set and ignition aid is turned on. At time 0 in Table 1 the CLC mode selection is begun. A sweep of the CLC mirrors is conducted, e.g., starting at the high voltage end or low voltage end without the tracking function $k\Sigma$ engaged. The mirrors are then driven by the circuit 10 of FIG. 1 through a range of operation, e.g., full scale from the maximum to the minimum operating voltage to the piezoelectric transducers 14 and 16. The processor 32 maps the intensity values and locates and stores the positions of all intensity peaks occurring during the sweep, during, e.g., time=0 sec. to time=6 sec. Thereafter, based upon startup temperature, a peak is selected as the gyro mode and the mirrors are driven to set the cavity length to resonate at the mode peak selected. Tracking is engaged and thereafter maintains the intensity at the selected mode peak as described above.

Figure 3:
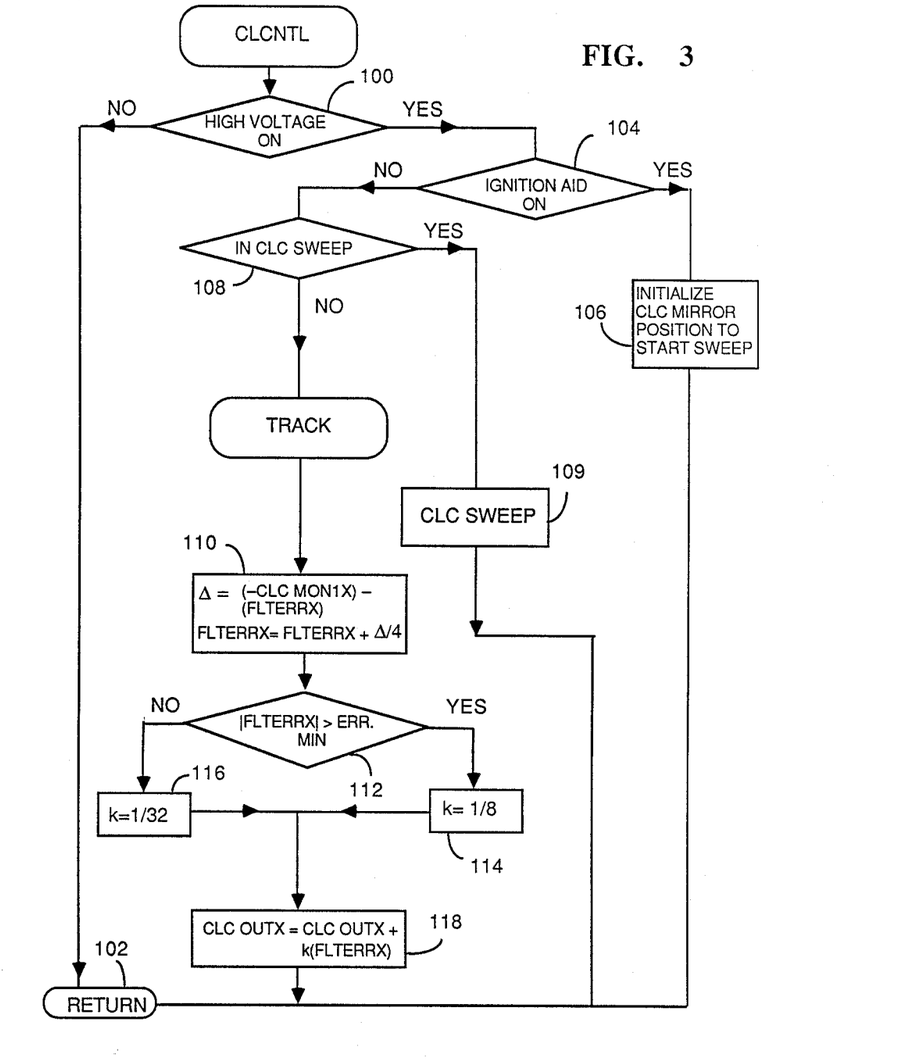
FIG. 3 shows a portion of the computer program flow diagram for digital data processing; for example, in a microprocessor to control the ring laser gyroscope.

It will be seen from the computer flow diagram of FIG. 3 that the cavity length control loop CLCNTL is not engaged until after high voltage on due to the determination being made in Block 100 of the program of whether high voltage is on or not. If high voltage is not on, the cavity length control loop goes to return in Block 102. If high voltage is on, as shown in Table 1, a determination is made in Block 104 whether the ignition aid has been turned on. If ignition aid is on, the temperature of the ring laser gyro is determined in Block 106. Also, in Block 106, the cavity length control voltage is ramped to its positive or negative extremity in Block 106. The decision on which end is selected is based upon startup temperature. It may be possible, therefore, to sweep only a portion of the CLC mirror travel. This is due to the fact that the initial mode peak selected will also be temperature dependent. Thus, e.g., if the initial mode peak to be selected is one of those to the right of 0 volts in FIG. 2, the cavity need only be swept from the maximum voltage down to 0 volts to map and locate the appropriate peak. After ignition aid has been turned on, as determined by the no decision in Block 104, it is determined in Block 108 whether the CLC track mode has been engaged. Prior to the engagement of the CLC track mode, the cavity length control acquire logic performs the CLCSWEEP loop explained in more detail in connection with FIGS. 4, 4A and 4B. In this loop, the optical intensity peaks are sensed and mapped through the entire span of the slewing capability of the cavity length control circuit piezoelectric controlled mirrors or some selected portion thereof, and the primary maxima locations determined and stored in memory. Based upon the initial temperature of the ring laser gyro, and according to logic contained in the cavity length control program in the microprocessor, an initial one of the maxima is selected for a mode about which the control circuit 10, referred to above, maintains zero detune.

When in the track mode, the program shown in FIG. 3 executes the program to obtain the signal CLCOUTX output of the I/O processor 32. In Box 110, a value D is set to equal minus the error signal CLCMONIX minus the previous value for FLTRERRX. A new value for FLTRERRX is set to equal the previous value of FLTRERRX plus Δ divided by four. A determination is then made in Block 112 whether the absolute value OF FLTRERRX is greater than some selected value. If so, the software gain factor is set to $\frac{1}{8}$, indicating the capture mode which provides a more rapid change in the error signal. This occurs when the value of FLTRERRX indicates that the feedback error signal is larger than some selected value, indicating the cavity path length differs from the desired maxima point sufficiently, (i.e., detune differs sufficiently from 0), to require more radical changes in the control signal to more rapidly move the cavity length control circuit piezo-electrically controlled mirrors, to reattain the desired intensity maximum. If the decision in Block 112 is a no, the software gain control factor k is correspondingly set to a small value 1/32. The output CLCOUTX of the I/O processor 32 is then set to the previous value of CLCOUTX plus k times the value of FLTRERRX.

Figure 4:
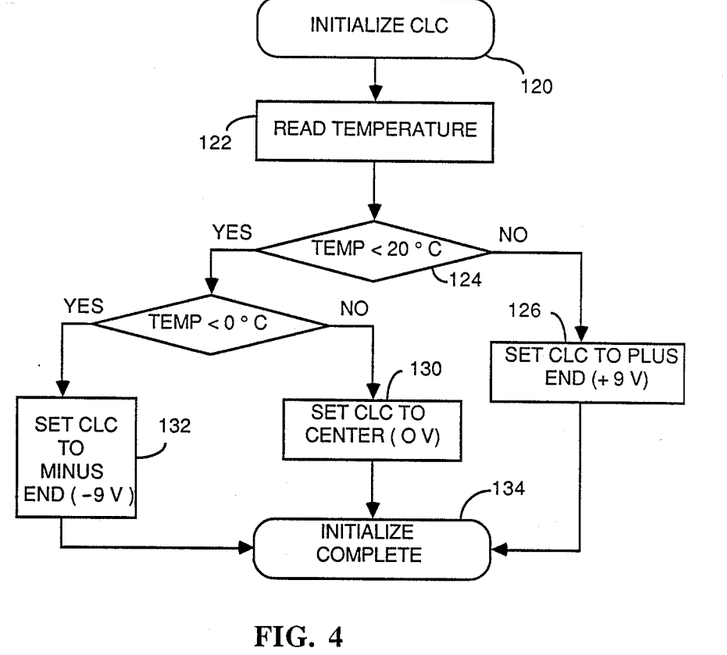
FIGS. 4, 4A and 4B show in more detail the CLCSWEEP portion of the program shown in FIG. 3.
Figure 4A:
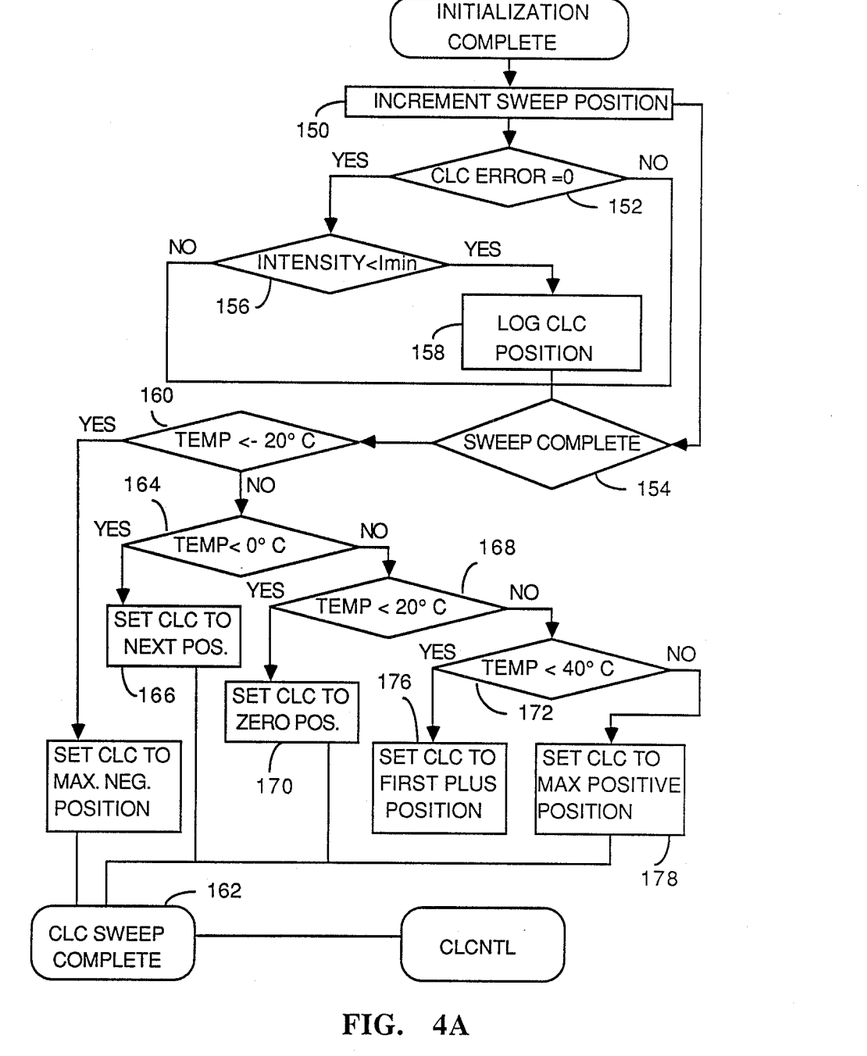

Turning now to FIG. 4, the program by which the microprocessor determines the location of the available maxima in the sweep of the cavity length control mirrors and selects a desired initial maxima point to obtain a selected integer multiple of the laser wave length, and also accommodate the predicted temperature range of operation, in order to avoid the necessity for mode hop during operation, is shown in further detail.

FIG. 4 shows a flow diagram for a program for the microprocessor 32 to initialize CLC starting in Block 120. In Block 122 the startup temperature value is determined. Signals indicative of temperature for input to the microprocessor 32 may be provided from a sensor on the ring laser body, as shown, e.g., in U.S. Pat. No. 4,314,174 to Wing et al, assigned to the assignee of the present invention, the disclosure of which is hereby incorporated by reference. In Block 124 a determination is made whether the temperature is greater than or equal to some selected value, e.g., 20° C. If not, the program executes the command in Block 126 to set CLC to the plus end. In this way the mirrors are driven with the high end of the piezoelectric transducer control voltage so that mapping commences from the largest cavity path length given the startup temperature. If the temperature at startup is determined to be less than 20° C., then a determination is made in Block 128 whether the temperature at startup is less than 0° C. If the temperature is greater than or equal to 0° C., the program executes the command in Box 130 to set the voltage at the mid-point, i.e., 0 volts, to set the mirrors for a mid-point cavity length. If the temperature is less than 0° C., the program executes the command in Box 132 to set the voltage to the transducers at the maximum minus value to place the mirrors at the minus voltage end of the CLC sweep, so that the mapping commences from the minimum cavity path length position of the mirrors.

Once initialization is complete, the program moves from Box 134 to Box 150 where the sweep position of the mirrors is incremented by changing the control voltage by some some small value d, e.g., 0.2 volts. The signal FLTRERRX (the digitally filtered error signal) representing the slope of the A.C. intensity curve, is then compared to 0 in Block 152. If it is not zero, the determination is made in Block 154 whether the sweep has been completed. This, as explained below, may be the completion of a sweep from the high voltage of e.g., +9 volts to the low voltage of, e.g., −9 volts or, e.g., from 0 volts to +9 volts and is preferably also software controlled.

If the determination is made in Box 152 that the CLC error is equal to zero, either a peak or valley exists at that value of the piezoelectric control voltage. In order to determine whether a peak or valley exists, and also to eliminate secondary peaks, a determination is made in Block 156, whether the optical intensity is greater than some minimum threshold value, e.g., 80% of the empirically determined peak value for a given gyroscope. If the value is greater than the selected threshold, the command is executed in Block 158 to log the CLC position. That is, the control signal voltage to the piezoelectric transducers is stored in a selected memory location. If such a value is stored or if the intensity does not exceed the threshold, the sweep voltage is incremented, unless the sweep is complete, as a result of the determination made in Box 154.

Once the sweep is complete, several intensity maxima will be stored, each in a respective memory location. For example, if the sweep commenced from the maximum minus voltage and the gyro exhibits four maximum peaks over the sweep range to the maximum plus voltage, the four peaks will be stored sequentially, i.e., from left to right as shown in FIG. 2, in four selected memory locations. The program then executes the portion which selects a particular peak dependent upon gyro startup temperature. The listed program (FIG. 4B) assumes a gyro which exhibits five peaks over the CLC sweep range, with one centered at about 0 volts to the transducers. Also, assumed for discussion here is that the cavity length control mirror sweep was from the maximum negative voltage end of the sweep to the maximum positive voltage end and the peak locations were stored, sequentially, in five selected memory locations.

Figure 4B:
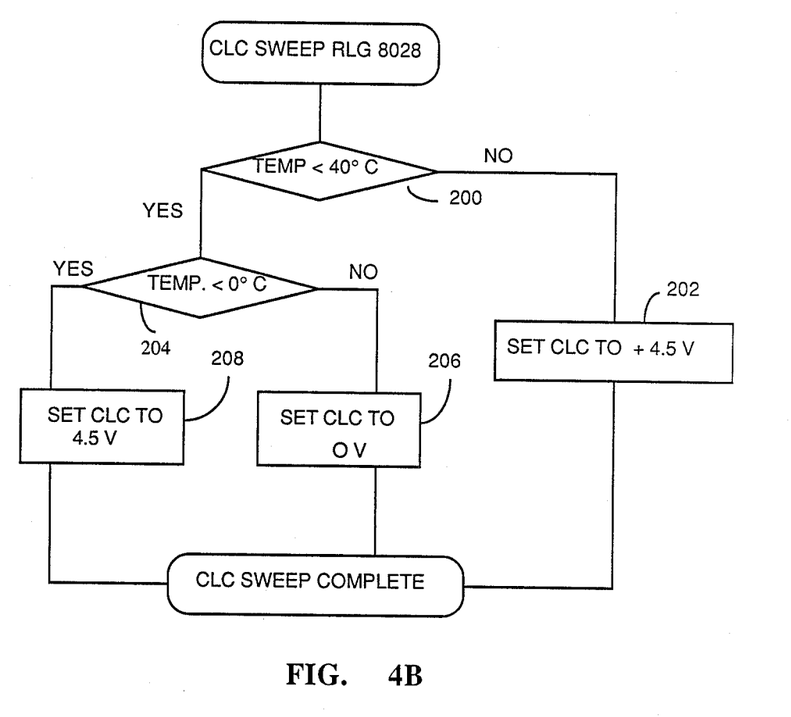

In Block 160 a determination is made whether the startup temperature is less than −20° C. If it is less than −20° C., the command is executed in Block 162 to set the cavity length control mirrors to the maximum negative location of a peak determined during the sweep. That is, the first of the sequentially stored maxima locations is selected from memory. If the temperature is equal to or exceeds −20° C., a decision is made in Block 164 whether the temperature is less than 0° C. If so, the next sequentially stored maxima is selected from memory according to the command in Block 166. Next, the program determines in Block 168 whether the startup temperature is less than 20° C., and if so, the next sequentially stored maximum location is selected from memory in Block 170, which would be the one centered closest to 0 volts. In block 172 a determination is made, if the decision in Block 168 is that startup temperature equals or exceeds 20° C., whether the startup temperature is less than 40° C. If it is, the next sequentially stored maximum location is read from memory; and if temperature equals or exceeds 40° C., the peak corresponding to the highest plus voltage is selected from memory.

Once a peak is selected in the manner prescribed above, CLCSWEEP is complete and the program initiates the tracking function described above, wherein the integral error signal $k\Sigma$ is employed to maintain the selected mode peak by keeping detune at 0.

FIG. 4B shows a program for a specific embodiment of the present invention employed in an 8028 ring laser gyro manufactured by the assignee of the present invention. It may be for some ring laser gyros, as it is for the 8028, that only a few (less than four at most) peaks exist in the sweep range of the CLC mirrors, and secondary peaks are absent or of negligible significance. In this case, it may empirically be determined that, at a selected voltage to the transducers, it is reasonably certain that the mirrors will be positioned to result in a cavity length on the upslope of the intensity curve at the desired one of the maxima, regardless of startup temperature.

In FIG. 2, (dot-dash curve), the intensity curve for the 8028 is drawn roughly to scale to illustrate that there are only three maxima and no secondary peaks. It will also be seen that selecting −4.5 volts, 0 volts or +4.5 volts will be adequate for three temperature bands, e.g., <10°; ≧10°, ≦40°; and >40° to select the appropriate one of the maxima.

Two factors contribute to the requirement for mapping and maxima storage explained above when the number of maxima increase, and/or secondary peaks occur. Due to startup temperature variation, the curve shifts due to temperature induced cavity length charges, as shown in FIG. 2, for example, for 20° C. and 70° startup temperature curves. Due to this, it is more difficult to select fixed voltages which will insure arriving at the proper peak. Also, if the fixed voltage should happen to be at a trough, it cannot be predicted to which of the maxima bracketing the trough the tracking function will track. The presence of secondary peaks increases the number of troughs, and thus, the uncertainty factor if fixed voltages are used. However, it has been found that with the 8028 the simple expedient of selecting one of three piezoelectric drive voltages, based upon startup temperature, will result in the proper intensity peak being selected as the gyro mode about which detune tracking is then carried out.

The program shown in FIG. 4B determines in Block 200 whether the startup temperature is less than, e.g., 40° C. If it is not, then the piezoelectric control voltage is set to +4.5 volts in Block 202, and the tracking function is engaged. As seen in FIG. 2, this results in positioning the CLC mirrors such that the intensity is on the upslope to the rightmost peak. Tracking then sets the cavity path length to attain this mode peak and maintain this mode.

If the temperature is determined in Block 200 to be less than or equal to 40° C., a determination is made in Block 204 whether the temperature is less than 0° C. If it is not, the CLC mirror drive voltage is set to 0 volts in Block 206 and if it is, the CLC mirror drive voltage is set to −4.5 volts in Block 208. In this manner, as described above, tracking, once engaged, will set the cavity length to, respectively, the mode just to the right of 0 volts or the mode to the left of 0 volts. It has been found that, even with a shift of the maximum curve, due to startup temperature variation, these voltages will still lie on the desired maxima upslope and enough away from the trough between the adjacent maxima to insure the proper mode is reached.

It will be seen by those skilled in the art that the present invention provides significant improvements to cavity path length control in ring laser gyros. Cavity path length is selected at startup, based upon startup temperature, to obtain a length which is the same integer multiple of the laser wavelength from startup to startup, regardless of temperature variations. In addition, the selected position of the mirrors gives the greatest degree of allowable cavity path length control mirror movement for expected temperature variations from the temperature at startup. The system is flexible enough to accommodate a control at startup, based upon empirically determined laser cavity characteristics for some lasers, in which startup temperature dictates which of a plurality of predetermined voltage is to be applied to the piezoelectric transducers of the cavity path length control mirrors. The central voltage is also based upon actual mapping of the intensity variation due to changing the mirror positions, (i.e., the cavity path length), for those lasers whose intensity variation characteristics are less susceptible to the fixed selected voltage manner of control. In this latter manner of control, the mapped intensity peaks are stored, and one is selected for the cavity path length control mode, based upon startup temperature.

Those skilled in the art will appreciate that many changes and modifications to the present invention may be made without departing from the scope and intent of the present invention. For example, the present invention has been described as being digitally implemented in a microprocessor programmed to carry out the present invention. It will be understood that, for example, large scale integrated circuits could be specifically constructed to perform the programmed functions. Also, the programmed functions, depending upon laser cavity characteristics could employ a greater or lesser number of temperature ranges upon which to base the selection of the startup mode. Also, the peak determination may be made and detune controlled using the intensity rather than the slope of the intensity.

These and other modifications will be apparent to those skilled in the art. It is the intention of the applicants, in the appended claims, to cover all such changes and modifications as come within the scope and content of the present invention.

What is claimed is:

1. A method for providing cavity length control in a ring laser gyroscope having a plurality of mirrors defining a path length for a pair of counterpropagating light beams and means for moving a selected one of the mirrors to change the cavity path length comprising the steps of:
    sensing the startup temperature of the ring laser gyroscope;
    dividing the difference between a maximum operational temperature and a minimum operational temperature of the ring laser gyroscope into a plurality of temperature ranges;
    determining which of the plurality of temperature ranges includes the startup temperature;
    moving the selected mirror through its entire sweep of cavity path length control movement at the startup of the ring laser gyroscope;
    sensing all intensity maxima in the optical intensity of the sum of the counterpropagating beams during the movement of the mirrors through the entire sweep; and
    initializing the means for moving the selected mirror to provide a cavity length corresponding to a maximum intensity of the counterpropagating light beams selected as a function of the temperature of the ring laser gyroscope at startup.

2. The method of claim 1 wherein the step of moving the selected mirror comprises the step of generating a control voltage varying over a selected voltage range, and the step of initializing the cavity length includes the step of storing a value of the control voltage determined during the sweep of the mirror and applying the stored control voltage to means for moving the selected mirror.

3. The method of claim 1 wherein the step of moving the selected mirror through the entire sweep comprises the step of generating a control voltage in stepwise increments through a selected voltage range and the step of initializing the cavity length comprises the step of storing digital signals indicative of the particular step in the stepwise incrementation of the selected mirror through the sweep where each of the sensed maxima occurs, and recovering from memory a selected digital data signal in response to the startup temperature.

4. The method of claim 3, further comprising the step of determining whether the intensity at each of the sensed maximum points exceeds a selected threshold intensity.

5. A method for providing cavity length control in a ring laser gyroscope having a plurality of mirrors and means for moving a selected one of the mirrors to change the cavity path length, comprising the steps of:
sensing the startup temperature of the ring laser gyroscope;
dividing the difference between a maximum operational temperature and a minimum operational temperature of the ring laser gyroscope into a plurality of temperature ranges;
determining which of the plurality of temperature ranges includes the startup temperature; and
initializing the selected cavity path length control mirror to a selected position in response to determined startup temperature by the steps of;
comparing the temperature at startup with a first temperature;
generating a first control signal if the temperature at startup is greater than the first temperature and, if not, for initiating a second temperature comparison;
comparing the temperature at startup with a second temperature;
generating a second control signal if the temperature at startup is greater than the second temperature, and, if not, for initiating a third temperature comparison;
comparing the temperature at startup with a third temperature; generating a third control signal if the temperature at startup exceeds the third temperature; and
generating a fourth control signal if the temperature at startup does not exceed the third temperature.

6. The method of claim 5 further comprising the steps of:
storing in data storage means data representative of a plurality of selected cavity length mirror positions; and
addressing the data storage means at a particular storage location in response to one of the first, second, third or fourth control signals.

7. The method of claim 6 further comprising the step of loading into the data storage means signals indicative of the occurrence and location of an intensity maximum during the sweep of each of a plurality of such intensity maxima.

8. A method for providing cavity length control in a ring laser gyroscope having a plurality of mirrors defining a path length and means for moving a selected one of the mirrors defining a path length and means for moving a selected one of the mirrors to change the cavity path length, comprising the steps of:
sensing the startup temperature of the ring laser gyroscope;
dividing the difference between a maximum operational temperature and a minimum operational temperature of the ring laser gyroscope into a plurality of temperature ranges;
determining which of the plurality of temperature ranges includes the startup temperature: and
initializing the selected cavity path length control mirror to a selected position in response to determined startup temperature by providing one of a plurality of predetermined output signals corresponding to each of the plurality of temperature ranges in response to a startup temperature within one of the temperature ranges.

9. The method of claim 8 further comprising the steps of:
providing a drive voltage to moving the selected mirror, having a range of possible operating voltages from a first negative value to a first positive value;
providing three temperature ranges including a first range of less than a first temperature, a second range of greater than or equal to the first temperature and less than or equal to a second temperature, and a third range of greater than the second temperature;
associating a first control signal with the first temperature range a negative voltage of about one-half the first negative voltage;
associating a third control with the third temperature range of about one-half of the first positive voltage.

10. The method of claim 9 further comprising the steps of controlling the means for moving the mirrors to position the mirrors at the intensity maximum closes to the position of the mirrors resulting from the one of the first, second or third control signals generated responsive to the temperature range that includes the startup temperature.

11. A method for providing cavity length control in a ring laser gyroscope having a plurality of mirrors that define a cavity length and including means for moving at least a selected one of the mirrors to change the cavity length, comprising the step of:
sensing the startup temperature of the ring laser gyroscope;
sweeping the selected mirror through its entire range of cavity length control movement at the startup of the ring laser gyroscope;
sensing the occurrence and locations of all intensity maxima in the sum of the counterpropagating beams during the movement of the selected mirror through the entire sweep; and
moving the selected mirror to a maximum intensity location selected as a function of the temperature of the ring laser gyroscope at startup to provide a predetermined cavity length.

12. A method for providing cavity length control for a ring laser gyroscope having a plurality of mirrors that define a cavity length for a pair of counterpropagating light beams and including means for moving at least a selected one of the mirrors to change the cavity length, comprising:
sensing the startup temperature of the ring laser gyroscope; and
moving a selected mirror to a location selected as a function of the startup temperature to provide a predetermined scale factor for the ring laser gyroscope at startup by the steps of:
sweeping the selected mirror through its entire range of cavity length control movement at each startup of the ring laser gyroscope;
sensing all intensity maxima in the sum of the counterpropagating light beams during the movement of the selected mirror through the entire sweep; and
positioning the selected mirror at a location to produce an intensity maximum corresponding to a predetermined cavity length.

* * * * *